United States Patent Office 3,149,863
Patented Sept. 22, 1964

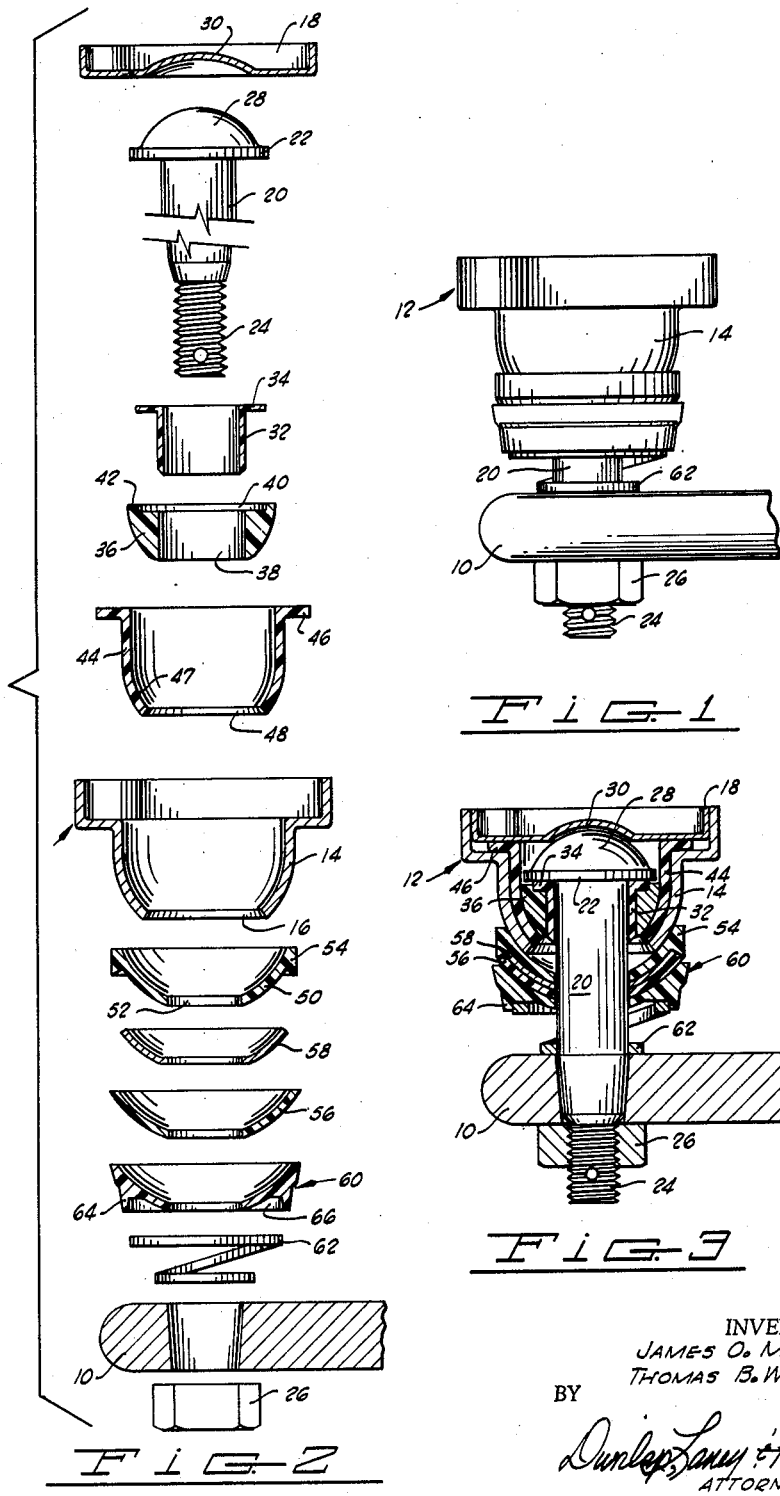

3,149,863
BALL AND SOCKET JOINT
James O. Melton, Norman, and Thomas B. Wilkinson, Oklahoma City, Okla., assignors to Jamco, Inc., Oklahoma City, Okla., a corporation of Oklahoma
Filed Nov. 28, 1962, Ser. No. 240,524
10 Claims. (Cl. 287—90)

This invention relates to a ball and socket joint. More particularly, but not by way of limitation, the present invention relates to a ball and socket joint of of the type which may be utilized in the front end suspension and steering system of an automobile for interconnecting two relatively movable metallic members.

The use of synthetic resin materials in the construction of joint and bearing assemblies has assumed increasing importance with the recent development of high density, synthetic resins having a low coefficient of friction, and having mechanical characteristics which make such resinous materials worthy substitutes for certain metallic elements which have previously been used in such joints and bearings. In many instances, the hardness of the synthetic resin material, coupled with its inherent lubricity, have permitted the resinous material to be substituted for such elements as ball or roller bearings in joints and bearing assemblies. Moreover, the high resistance of some of the resins, such as the polyhalohydrocarbons and the long chain polyamides, to corrosion by certain deleterious materials, such as mud, motor sludge and moisture, makes these materials ideally suited for use in the idler arm and ball joint assemblies which are utilized in the front end suspension systems of automobiles.

Quite recently, applicants, in their copending United States application Serial No. 108,059, now Patent No. 3,079,186, filed on May 5, 1961, and assigned to the assignee of the present invention, have proposed the use in a ball joint assembly of a pair of abutting bearing elements constructed of synthetic resins having different molecular structures. The use of the two plastics of differing molecular construction in bearing contact with each other has been found to considerably reduce the drag or frictional resistance to turning of two relatively moving parts over that which is experienced when two plastics of identical molecular structure are utilized in juxtaposition to each other. In the cited copending patent application, the pair of differing synthetic resins are employed in the portion of the ball joint assembly which is interposed between the coil spring which retains the ball in contact with its frusto-spherical socket, and the external periphery of the socket. This construction, while it vastly improves the performance of the ball and socket joint as such joint may be used, for example, in the front suspension system of an automobile, still does not eliminate the need for some lubrication of the ball head which moves within the metallic socket.

In recently issued United States Patent 2,912,267 to Latzen, the patentee has proposed to provide a ball and socket joint in which the ball head contained within the metallic socket is surrounded by a synthetic plastic seat so that the ball head moves upon the resinous material rather than upon the metal of the surrounding socket. In this manner, a substantial reduction is realized in the amount of lubrication of the ball joint which is required, and the resistance to corrosion of the bearing surface has also been substantially improved.

Despite the substantial improvement in ball and socket joint construction which is afforded by the arrangement of elements proposed in the Latzen patent, the ball and socket joints therein illustrated and described still lack the improvement in ease of turning of the relatively moving members which is achieved through the use of a pair of juxtapositioned bearing members which are each constructed of synthetic resins, and, more particularly, of synthetic resins of differing molecular structure. Moreover, the Latzen ball and socket joint continues to rely upon the use of a solid steel or metallic ball head carried within a metallic socket and such ball head construction is relatively expensive to fabricate.

It is an object of the present invention to provide an improved ball and socket joint in which the bearing surfaces utilized in the joint are entirely constructed of high density, synthetic resin material and thus afford a substantial decrease in the resistance to rotation and oscillation of the relatively moving members of the joint structure.

A further object of the present invention is to provide a ball and socket joint in which the ball head carried at the end of a spindle in such joint is predominantly constructed of a high density synthetic resin material and thus may be fabricated more economically than the steel or metallic ball heads heretofore utilized.

An additional object of the present invention is to provide a ball and socket joint which is more compact and requires less room for installation than ball and socket joints of the type heretofore utilized.

Yet another object of the present invention is to provide a ball and socket joint which does not require lubrication during its operating life.

A further object of the present invention is to provide a ball and socket joint which may be economically constructed, is characterized by a long and trouble-free operating life and is well adapted for use under servere operating conditions, such as those encountered in the normal operation of the front end suspension system of an automobile.

The structure of the present invention which permits the accomplishment of the foregoing objectives comprises a metallic housing which is adapted to be secured to one of two relatively moving members which are to be interconnected by the ball joint; a spindle projecting through an opening in the housing and carrying at its end inside the housing a ball head which is comprised of a solid segmented sphere of synthetic resin, and means at said end of the spindle for preventing the solid segmented sphere of synthetic resin from being axially displaced past said end of the spindle; and a synthetic resin bearing element positioned between the housing and the solid segmented sphere and conforming at its inner periphery to the configuration of the outer peripheral surface of the synthetic resin segmented sphere and at its outer periphery to the inner surface of the metallic housing.

This construction permits a substantial reduction in the resistance to turning of the ball head within its housing to be realized over that which usually is experienced in conventional ball and socket joints wherein the ball head is constructed of steel or other metallic material and bears directly against the metallic housing, or even against a plastic material as disclosed in the Latzen patent. Also, the fabrication of the ball head from a high density synthetic resin permits the joint to be more economically constructed than constructions involving the use of steel or other metals. The use of a relatively small spherical segment as the ball member also permits the over-all dimension of the joint to be reduced and more compactness of structure to be achieved.

To describe a preferred embodiment of the invention with greater specificity, the structure hereinbefore described is further modified by the inclusion therein of a synthetic resin sleeve which slidingly surrounds the spindle and carries at one of its ends an annular flange which abuts against the preventing means at the upper end of the spindle. The synthetic resin sleeve thus reduces the frictional drag produced by rotation of the segmented spherical resin member on the spindle, and also makes complete the elimination of any plastic to metal, or metal to metal bearing surfaces in the ball joint assembly.

As yet a further embodiment of the invention, the ball joint per se of the invention is incorporated in combination with synthetic resin bearing elements of the type described in the hereinbefore cited co-pending application, which elements function to reduce the frictional resistance generally afforded by the coil spring used to load such joints to the relative turning movement of the two members which the joints interconnect.

In addition to the foregoing described objects and advantages of the invention, additional advantages will be discerned by the reader from the following detailed description of the invention when considered in conjunction with the accompanying drawings which illustrate our invention.

In the drawings:

FIGURE 1 is a view in elevation of a ball and socket joint embodying a preferred construction of the present invention.

FIGURE 2 is an exploded view of the ball and socket joint shown in FIGURE 1 and illustrating the various parts of the invention.

FIGURE 3 is a vertical sectional view through the assembled ball and socket joint of the present invention.

Referring now to the drawings in detail, reference character 10 designates one of two relatively moving members which it is desired to interconnect by means of the ball and socket joint of the present invention. A metallic housing designated generally by reference character 12 is adapted to be connected to the other of the two relatively moving members by means of bolts, rivets or other suitable means (not shown). The housing 12 is provided with a frusto-spherical metallic socket portion 14 which terminates at one of its ends in a circular opening or aperture 16, as shown in FIGURE 2. The metallic housing 12 is closed by means of a cap plate 18 which is secured across the top thereof and prevents the ingress of dust, water and other deleterious materials to the interior of the socket. It will be noted that the metallic housing 12, except for the opening 16 therethrough, is completely closed and does not carry a grease zerk or other conventional fitting usually provided to permit the socket to be lubricated.

The several elements utilized in the ball and socket joint of the present invention may be best perceived by reference to the exploded view of FIGURE 2. It will be perceived by reference to this figure in conjunction with FIGURE 3 that a metallic rod or spindle 20 projects through the opening 16 in the socket portion 14 of the metallic housing 12 and carries an annular flange 22 at its end inside the socket portion 14. At its opposite end 24, the spindle 20 is threaded to facilitate the securement of the spindle to the member 10 by the use of a nut 26. A hole 27 is formed in the end 24 of the spindle to receive a cotter pin (not shown) to prevent loss of the nut 26. The shank of the spindle 20 adjacent the annular flange 22 is cylindrical and smooth surfaced.

A metallic spherical segment 28 is positioned on the opposite side of the annular flange 22 from the spindle 20, and in the assembled status of the ball and socket joint, bears against a mating arcuate indentation 30 formed in the cap plate 18. In some embodiments of the invention, the metallic spherical segment 28 may be omitted. A generally cylindrical sleeve 32, which is preferably constructed of a high density, synthetic resin material is positioned around the smooth cylindrical portion of the shank of the spindle 20 in juxtaposition to the annular flange 22. Although the sleeve 32 may be omitted from the assembly without detrimentally affecting a number of the advantages afforded by the present invention, its presence is preferred for reasons hereinafter discussed. The generally cylindrical sleeve 32 carries at its end adjacent the flange 22 an annular flange 34 of high density synthetic resin which abuts the flange 22 when the joint is assembled. The diameter of the annular synthetic resin flange 34 is slightly less than the diameter of the metallic annular flange 22 so that the latter flange overhangs or extends slightly beyond the resin flange in a radial direction.

A spherical segment 36 which is constructed of a high density synthetic resin is provided with a central cylindrical bore 38 therethrough which is dimensioned to slidingly receive the sleeve 32 and, in the assembled status of the joint, is rotatably mounted on the sleeve 32. A circular indentation 40 is formed in the upper surface of the synthetic resin spherical segment 36 and is of a size to snugly receive the synthetic resin flange 34 without the circumferential lip 42 which defines the indentation 40 binding against the flange 34 when the spherical segment 36 is rotated on the sleeve 32.

As a final element of the interior bearing structure positioned within the metallic housing 12, a generally frusto-spherical resin socket member 44 is utilized. The resin socket member 44 has an outer peripheral configuration which conforms to the inner periphery of the metallic socket portion 14 and is provided at its larger end with a radially extending annular flange 46 which is positioned between the metallic housing 12 and the cap plate 18. This location of the flange 46 prevents the resin socket 44 from oscillating in the metallic socket 14. The inner peripheral surface 47 of the resin socket member 44 adjacent the end defined by the minor plane thereof is of a configuration which conforms to the outer peripheral surface of the synthetic resin spherical segment 36. The cylindrical bore 38 through the spherical segment 36 is aligned with an opening 48 through the end of the resin socket 44 opposite its associated flange 46.

Before proceeding to a description of the remaining elements of the ball and socket joint, it is believed that the clearest understanding of the operation of the invention may be obtained by first describing the operation of those elements which have thus far been described.

When the ball and socket joint of the invention is assembled, the metallic spherical segment 28 carried at the top of the spindle 20 bears against the complementary indentation 30 in the cap plate 18. The metallic housing 12 is completely sealed at its upper end by the cap plate 18 and the spindle 20 projects through the opening 16 formed in the lower end of the frusto-spherical socket portion 14 of the housing 12. The resinous socket member 44 provides a liner within the metallic socket member 12 which is fixed against oscillating movement in a plane extending through the axis of the spindle 20, although limited rotational movement of the resinous socket member 44 about such axis can occur.

As will be subsequently explained, a constantly biasing force is applied to the lower end 24 of the spindle 20 and tends to bias the upper end of the spindle 20 away from the cap plate 18 and toward the opening 16 in the metallic housing 12. Positioned between the metallic, annular flange 22 at the head or top of the spindle 20 and the opening 16 in the housing 12 are the synthetic resin cylindrical sleeve 32 and the synthetic resin spherical segment 36. These elements, along with the resin socket member 44, form a bearing in which metal to metal, as well as plastic to metal, contact is completely eliminated. The upper end of the resin spherical segment 36 bears against the annular flange 34 of the sleeve 32. The circumferential lip 42 which defines the circular indentation 40 in the spherical segment 36 is prevented from contacting the annular metallic flange 22 by virtue of the greater thickness of the resin flange 34 than the depth of the circular indentation 40.

The external periphery of the resin sleeve 32 will generally rotate with the spindle 20 when the latter element is rotated. A bearing surface is established between the external periphery of the sleeve 32 and the walls of the cylindrical bore 38 through the spherical segment 36.

The spherical segment 36 may move in rotation about the axis of the spindle 20 and in oscillating movement within the resin socket 44. In each movement, a resin to resin bearing is formed between the external peripheral surface of the spherical segment 36 and the mating internal peripheral surface 47 of the resin socket member 44. The cooperation between the resin flange 34, the circumferential lip 42 and the metallic flange 22 provides a tight seal against the ingress of deleterious materials to the interior of the socket.

It will be perceived by those familiar with the technology appertaining to ball and socket joints that the metallic ball member which is usually employed in such joints has been substantially replaced in the present invention by the spherical segment 36 which, as has been explained, is constructed of a high density synthetic resin. The joint which is formed in the prescribed manner does not require lubrication and is relatively compact and highly durable in construction.

We have determined that a decrease in the resistance offered by plastic to plastic bearing elements to turning movement is obtained when the cooperating bearing surfaces are formed of two resins or plastics having dissimilar molecular characteristics. Although the exact explanation of the observed improvement is not known with certainty, it is believed that the high pressures and relatively high temperatures which obtain from time to time in highly loaded bearings cause some interpolymerization to occur in instances where the molecular character of the two contacting bearing surfaces is identical rather than substantially different, as proposed by the present invention. In a preferred embodiment of our invention, several high density synthetic resin materials have been effectively employed, including, but not limited to, long chain polyamides, such as those sold under the trademark Nylon, high density long chain polyethylenes, such as those sold under the trademark Marlex, and polyhalohydrocarbons, such as those sold under the tradenames Kel-F and Teflon. In a preferred embodiment of the invention, the spherical segment 36 is constructed of high density polyethylene, whereas the frusto-spherical socket member 44 and the sleeve 32 are both constructed of Nylon.

The remaining portion of the ball and socket joint of the present invention is substantially identical to that portion of such a joint which is described and claimed in our co-pending application Serial No. 108,059, to which reference has hereinbefore been made. However, the bearing elements which are interposed between the relatively moving member 10 and the metallic socket member 12, and which are shown and described in such application, function especially well in cooperation and in combination with the elements of the present invention hereinbefore described, and it is intended that the present invention extend to and include, in one of its aspects, the bearing elements which will next be described.

A plastic socket member 50 which is constructed of a high density, synthetic resin material having a low coefficient of friction is positioned around the spindle 20 below the metallic housing 12. The plastic socket member 50 is frusto-spherical in configuration and mates with the outer peripheral surface of the metallic housing 12 when the ball joint is assembled in operative position as illustrated in FIGURE 3. A circular opening or aperture 52 which is provided in one side of the plastic socket member 50 is only slightly larger in diameter than the spindle 20 so that the opening 16 in the lower side of the metallic socket member 12 is substantially sealed by the plastic socket member. An annular flange 54 is provided around the upper edge of the outer periphery of the frusto-spherical socket member 50 for a purpose hereinafter to be explained, and is also constructed of a synthetic resin having a high density, considerable hardness and a low coefficient of friction. Preferably, the plastic socket member 50 and the annular flange 54 are molded integrally.

A frusto-spherical washer 56 which is complementary in configuration to the frusto-spherical plastic socket member 50 is positioned around the spindle 20 and, like the socket member 50, is constructed of a high density, synthetic resin material. A metallic liner 58 is interposed between the washer 56 and the plastic socket member 50 and is also frusto-spherical in configuration to mate with the inner periphery of the washer 56 and the outer periphery of the socket member 50 with which surfaces it is in contact.

A thrust washer designated generally by reference character 60 is interposed between the resin washer 56 and a helical compression spring 62 which is used to place the ball and socket joint in tension. The thrust washer 60 is characterized by a generally frusto-conical outer peripheral surface and a frusto-spherically shaped inner peripheral surface which mates with the plastic washer 56. The smaller end of the thrust washer 60 is provided with an annular, axially extending flange 64 which defines a cup-shaped recess at this end of the thrust washer. In actuality, the end of the thrust washer 60 which is of smaller diameter is convex in configuration and corresponds to the concave frusto-spherical inner periphery of the thrust washer so that a groove 66 of generally V-shaped cross-section is formed between the smaller end of the thrust washer and the annular flange 64. For reasons which have been hereinbefore discussed, the thrust washer 60 is preferably constructed of a high density, synthetic resin having a molecular structure which differs from the molecular structure of the plastic used in the fabrication of the resin washer 56. Thus, binding or interpolymerization of the two plastic materials of construction of the resin washer 56 and the thrust washer 60 is obviated.

The helical compression spring 62 which is used to preload the ball and socket joint is located between the thrust washer 60 and the relatively moving member 10 which the joint connects to a second relatively moving member (not shown). The convolutions of the spring 62 are of decreasing diameter from one of its ends to the other end so that, when the spring is highly compressed to preload that ball and socket joint, the convolutions may be telescoped inside each other. The largest convolution of the spring 62 which is located at one of its ends is of a diametric dimension such that it must be slightly contracted in order to fit in the groove 66 inside the flange 64 of the thrust washer 60.

When, in the assembly and operation of the ball and socket joint of the present invention, the nut 26 is tightened upon the spindle 20, the ball and socket joint is placed in tension with the ball head constituted by the elements 28, 22 and 36 being forced toward the opening 16 in the lower end of the metallic housing 12. When the ball and socket joint is so assembled, a partial seal of the metallic housing 12 is afforded by the plastic socket member 50. Oscillation of the spherical segment 36 within the socket member 44 as a result of movement of the spindle 20 causes the outer peripheral surface of the plastic washer 56 to be moved relative to the thrust washer 60. It is thus perceived that a considerable lowering of the resistance which is offered to pivotation or rotation of the spindle 20 is afforded by incorporating the bearing means which includes the plastic socket member 50, the metallic liner 58, the plastic washer 56 and the thrust washer 60 in the present invention.

It will be manifest to those skilled in the art that certain details of construction of the present invention may be modified or altered to meet certain existing operating conditions or needs without departing from the spirit and scope of the invention as defined by the appended claims.

We claim:

1. A ball and socket joint for interconnecting two relatively moving members comprising:

(a) a metallic socket having an opening therethrough and adapted to be connected to one of said relatively moving members;

(b) a rod projecting through the opening in said socket and having an annular flange at one end thereof lying substantially in a plane extending normal to the axis of said rod, said flange being positioned inside said metallic socket and said rod having its other end connected to the other of said relatively moving members;

(c) a synthetic resin sleeve slidingly surrounding said rod and having a generally cylindrical outer peripheral surface, said sleeve further having an annular flange at the end thereof adjacent the annular flange on said rod;

(d) a synthetic resin first bearing element having a cylindrical bore therethrough slidingly receiving said sleeve and forming a bearing therewith, and further having a frusto-spherical outer peripheral surface oriented coaxially with said cylindrical bore; and (e) a synthetic resin second bearing element positioned between said first bearing element and said metallic socket and having an inner peripheral surface complementary to the frusto-spherical outer peripheral surface of said first bearing element and in sliding contact therewith and dimensioned externally to fit snugly in said metallic socket.

2. A ball and socket joint as claimed in claim 1 wherein said synthetic resin sleeve and said synthetic resin second bearing element are constructed of a synthetic resin having a differing molecular structure from the synthetic resin of which said first bearing element is constructed.

3. A ball and socket joint as claimed in claim 2 wherein said synthetic resin sleeve and said synthetic resin second bearing element are constructed of a long chain polyamide and said synthetic resin second bearing element is constructed of high density polyethylene.

4. A ball and socket joint as claimed in claim 1 wherein said metallic socket comprises:
   (a) a hollow, frusto-spherical portion;
   (b) a flange secured to said frusto-spherical portion and lying in the major plane defining said frusto-spherical portion, said flange comprising a flat plate adapted for securement to one of said relatively moving members;

and further characterized to include
   (c) an annular lip of synthetic resin material secured around the outer peripheral surface of said second bearing element at the larger end thereof and bearing against the flange on said metallic socket.

5. A ball and socket joint as claimed in claim 1 wherein said metallic socket includes a portion having a frusto-spherical outer peripheral surface, and the opening through said socket is in the minor plane of said frusto-spherical surface; and further characterized to include
   (a) a synthetic resin socket member around said rod and having a frusto-spherical surface mating with the frusto-spherical outer peripheral surface of said metallic socket;
   (b) a frusto-spherical synthetic resin washer around said rod and complementary in configuration to the frusto-spherical surface of said synthetic resin socket member;
   (c) a frusto-spherical metallic liner interposed between, and bearing against, said washer and said synthetic resin socket member for reinforcing said washer and for evenly transmitting force from said washer to said synthetic resin socket member;
   (d) a synthetic resin thrust washer mating with said frusto-spherical washer for transmitting thrust to said frusto-spherical washer and forming a bearing with said frusto-spherical washer; and
   (e) resilient means interposed between the second of said two relatively moving members and said thrust washer for biasing said thrust washer toward said frusto-spherical resin washer and away from said second relatively moving member.

6. A ball and socket joint as claimed in claim 5 wherein said synthetic resin sleeve and said synthetic resin second bearing element are constructed of a synthetic resin having a differing molecular structure from the synthetic resin of which said first bearing element is constructed.

7. A ball and socket joint as claimed in claim 5 wherein said frusto-spherical resin washer and said thrust washer are constructed of resins having dissimilar molecular structures.

8. A ball and socket joint as claimed in claim 6 wherein said frusto-spherical resin washer and said thrust washer are constructed of resins having dissimilar molecular structures.

9. A ball and socket joint for interconnecting two relatively moving members comprising:
   (a) a metallic socket having an opening therethrough and adapted to be connected to one of said relatively moving members;
   (b) a rod projecting through the opening in said socket and having a radially extending flange around the periphery of the rod at one end thereof and lying substantially in a plane extending normal to the axis of said rod, said flange being positioned inside said metallic socket, and said rod having its other end connected to the other of said relatively moving members;
   (c) a synthetic resin sleeve slidingly surrounding said rod and having a generally cylindrical outer peripheral surface;
   (d) a synthetic resin first bearing element having a cylindrical bore therethrough slidingly receiving said sleeve and forming a bearing therewith, and further having a frusto-spherical outer peripheral surface oriented coaxially with said cylindrical bore; and
   (e) a synthetic resin second bearing element positioned between said first bearing element and said metallic socket and having an inner peripheral surface complementary to the frusto-spherical outer peripheral surface of said first bearing element and in sliding contact therewith and dimensioned externally to fit snugly in said metallic socket.

10. A ball and socket joint comprising:
   (a) a spindle;
   (b) a ball head at one end of said spindle, said ball head including:
      (i) a solid segmented sphere of synthetic resin coaxially and rotatably positioned around said spindle; and
      (ii) means at said one end of said spindle for retaining said solid, segmented sphere against axial displacement past said one end of the spindle;
   (c) a metallic housing enclosing said ball head, having an opening extending through one side thereof through which said spindle passes, and including a portion having a frusto-spherical outer peripheral surface coaxially aligned with and surrounding said opening through one side of said housing;
   (d) a synthetic resin bearing element positioned in said housing between said housing and said solid, segmented sphere, said synthetic resin bearing element having an outer peripheral surface conforming in configuration to the inner surface of said metallic housing, and having an inner peripheral surface conforming in configuration to the outer peripheral surface of said synthetic resin segmented sphere whereby a greaseless bearing is established between said bearing element and segmented sphere when said spindle is oscillated and rotated;
   (e) a synthetic resin socket member around said spindle and having a frusto-spherical surface mating with the frusto-spherical outer peripheral surface of said metallic housing;

(f) a frusto-spherical synthetic resin washer around said spindle and complementary in configuration to the frusto-spherical surface of said synthetic resin socket member;

(g) a frusto-spherical metallic liner interposed between, and bearing against, said washer and said synthetic resin socket member for reinforcing said washer and for evenly transmitting force from said washer to said synthetic resin socket member;

(h) a synthetic resin thrust washer mating with said frusto-spherical washer for transmitting thrust to said frusto-spherical washer and forming a bearing with said frusto-spherical washer; and (i) resilient means interposed between the second of said two relatively moving members and said thrust washer for biasing said thrust washer toward said frusto-spherical resin washer and away from said second relatively moving member.

References Cited in the file of this patent
UNITED STATES PATENTS

| | | |
|---|---|---|
| 2,912,267 | Latzen | Nov. 10, 1959 |
| 2,913,268 | Booth | Nov. 17, 1959 |
| 2,995,381 | Melton et al. | Aug. 8, 1961 |
| 3,019,041 | Scheublein et al. | Jan. 30, 1962 |

FOREIGN PATENTS

| | | |
|---|---|---|
| 214,186 | Australia | Apr. 1, 1958 |